US007334342B1

(12) United States Patent
Barr et al.

(10) Patent No.: US 7,334,342 B1
(45) Date of Patent: Feb. 26, 2008

(54) MARKING DEVICE HAVING MARKING MEMBERS

(76) Inventors: William Ack Barr, 5854 Buffalo River Rd., Earlysville, VA (US) 22936; Deborah F Barr, 5854 Buffalo River Rd., Earlysville, VA (US) 22936; William H Fulton, 7102 Little Buck Creek, White Salmon, WA (US) 98672

( * ) Notice: Subject to any disclaimer, the term of this patent is extended or adjusted under 35 U.S.C. 154(b) by 153 days.

(21) Appl. No.: 11/206,103

(22) Filed: Aug. 18, 2005

Related U.S. Application Data

(63) Continuation-in-part of application No. 10/282,662, filed on Oct. 29, 2002, now Pat. No. 6,948,257, which is a continuation-in-part of application No. 09/851, 007, filed on May 8, 2001, now Pat. No. 6,470,585, which is a continuation-in-part of application No. 09/258,874, filed on Feb. 26, 1999, now Pat. No. 6,226,822.

(60) Provisional application No. 60/082,834, filed on Apr. 23, 1998, provisional application No. 60/076,349, filed on Feb. 27, 1998.

(51) Int. Cl.
*G01B 1/00* (2006.01)
*B41F 31/00* (2006.01)

(52) U.S. Cl. ......................... 33/528; 101/327; 101/333

(58) Field of Classification Search .................. 33/528, 33/668, 768, 42, 666, 562, 563, DIG. 10; 101/333, 327
See application file for complete search history.

(56) References Cited

U.S. PATENT DOCUMENTS

| | | | | |
|---|---|---|---|---|
| 3,913,235 | A * | 10/1975 | Tenneson et al. | 33/528 |
| 4,335,511 | A | 6/1982 | Bowling | |
| 4,372,050 | A * | 2/1983 | Eisenhauer | 33/528 |
| 4,735,143 | A | 4/1988 | Weir | |
| 4,793,069 | A * | 12/1988 | McDowell | 33/528 |
| 4,852,007 | A | 7/1989 | Yasunobu et al. | |
| 4,953,733 | A | 9/1990 | Loscuito | |
| 4,969,269 | A | 11/1990 | Dominguez | |
| 4,970,954 | A | 11/1990 | Weir et al. | |
| D313,945 | S * | 1/1991 | Thomas et al. | D10/64 |
| 5,107,601 | A | 4/1992 | Semchuck | |
| 5,765,484 | A | 6/1998 | Lam | |
| 5,850,787 | A | 12/1998 | Pichler | |
| 5,860,219 | A * | 1/1999 | Wilkinson | 33/528 |
| 5,899,142 | A | 5/1999 | Suda et al. | |
| 6,226,822 | B1 | 5/2001 | Chen | |
| 6,463,668 | B1 * | 10/2002 | Williams | 33/528 |
| 6,470,585 | B2 | 10/2002 | Barr | |
| 6,810,598 | B2 * | 11/2004 | Boys | 33/528 |
| 7,010,861 | B2 * | 3/2006 | Nicholson | 33/42 |
| 2004/0083617 | A1 * | 5/2004 | Bielen | 33/528 |
| 2004/0244212 | A1 * | 12/2004 | Melittas | 33/528 |

* cited by examiner

*Primary Examiner*—Gail Verbitsky
(74) *Attorney, Agent, or Firm*—Sheldon H. Parker

(57) ABSTRACT

A marking device is disclosed to enable the placement of an indicator mark on one side of a sheet of material to mark the approximate periphery of a stationary object. The device is affixed to the stationary object with channels that allow for an element to be mounted within the object. A removable contact pad, portions of which extend above the base surface, is connected to the base through the use of a pair of flanges.

27 Claims, 3 Drawing Sheets

MARKING DEVICE HAVING MARKING MEMBERS

CROSS-REFERENCE TO RELATED APPLICATIONS

This application is a continuation in part of U.S. application Ser. No. 10/282,662 filed Oct. 29, 2002 now U.S. Pat. No. 6,948,257 which is a continuation in part of U.S. application Ser. No. 09/851,007 filed May 8, 2001 and issued Oct. 29, 2002 as U.S. Pat. No. 6,470,585, which is a continuation in part of Ser. No. 09/258,874 filed Feb. 26, 1999 and issued as U.S. Pat. No. 6,226,822 Issued May 8, 2001, which is a continuation in part of Provisionals 60/082,834 filed Apr. 23, 1998 and 60/076,349 filed Feb. 27, 1998, all of which are incorporated herein as if recited in full.

BACKGROUND

1. Field of the Invention

The invention relates to a device, and its securing system, for marking the backside of sheet material to enable openings to be accurately located and cut into the material.

2. Related Art

Plasterboard, also known as Sheetrock®, wallboard and gypsum board, has been used to replace plaster in construction for several decades. In comparison to plaster, plasterboard installs rapidly and requires substantially less manual labor. Plasterboard, however, still has installation problems which the industry has been attempting to solve.

Not the least of these problems is the marking of specific areas to be cut out. Currently these cutout areas, such as for outlet boxes, switch boxes, ceiling light fixture openings, heating vents, etc., are determined by measuring vertically and horizontally, from the adjacent plasterboard and floor or ceiling. The measurements are subsequently transferred to the plasterboard for cutting and installation. This is a time consuming process, even for professional installers. Plasterboard fortunately provides some leeway in that “mistakes” can be compensated through the use of drywall compound. The installation of wall paneling, however, does not provide any such leeway and a mistake in measuring and cutting can be quite costly.

The need for a rapid, easy to use marking device has been recognized in the construction field and is reflected in the prior art patents. U.S. Pat. No. 4,953,733 recognizes the need to mark plasterboard on the back side and has disclosed a device for use with electrical outlet boxes. The ’733 device is provided with ears at each corner which fit within the outlet box. Arrow shaped marking elements are provided at the corners to engage the plasterboard. A securing screw can be inserted into a receiving hole within the body of the ’733 device to secure the device to the outlet plug receptacle. Due to the construction of the ’733 device, the marking elements are wedged into the plasterboard to mark the location of the outlet/switch box. Once the plasterboard is pressed onto the ’733 device and removed for cutting the marking elements become wedged into the plasterboard and must be removed prior to cutting the marked area. To prevent the device from being removed from the outlet with the plasterboard, the device must be secured through use of the securing screw. One of the problems with the ’733 device is the necessity of securing the device to the outlet prior to measuring as well as removing the device after measuring, requiring substantial time on the part of the installer. Further, this device cannot be used on hard materials, such as paneling, tile or plywood. If the device is unsecured and retained within the plasterboard upon removal, the plasterboard must be maintained parallel to the wall during removal. Angling the plasterboard during removal could cause the ears of the device to catch on the outlet or even break up plasterboard.

U.S. Pat. No. 5,107,601, issued to Semchuck, uses a tempad consisting of indicia which define a hole pattern. These indicia are used to assist in drilling holes for mounting objects, such as towel bars. This device, however applies only to front mounted articles and does not provide any assistance with marking cut outs from the back of a rigid panel.

U.S. Pat. No. 4,969,269 discloses a device for punching cutouts through sheets of drywall. The ’269 device has a pulley system which is used to cut the drywall in the shape of the outlet. The device is relatively expensive to produce and complicated to use.

U.S. Pat. No. 4,335,511 covers a marking device that marks the center of the outlet through use of an indicator which places an indentation in the wallboard at the center point of the outlet box. The wallboard is then horizontally placed, one half the depth of the wallboard is cut out in the shape of the outlet on the first side, the wallboard is turned over, and the remaining depth of the cutout is made. Cuts are made by striking the device that cuts into the wallboard. An inherent problem is that wallboard can break easily and unevenly when sharply struck, as it is brittle. Additionally, wallboard, is heavy and not easily moved or turned, rendering the ’511 device awkward to use.

Co-pending application Ser. No. 10/282,662 addresses and resolves the problem of marking sheet rock without the receptacle or switch installed in the outlet. However, due to the channel securing mechanism and contact pad location of the 10/282,662 application, the unit cannot be used with previously installed receptacles or switches.

The disclosed invention overcomes the difficulties encountered in the prior art by providing a simple, inexpensive device for marking the reverse side of sheets of all types of material, such as paneling, plasterboard, floorboards, tiles, etc. when receptacles or switches have been installed.

SUMMARY

A marking device for placing an indicator mark on one side of a sheet of material to mark the approximate periphery of at least a portion of a stationary object is disclosed. The marking device has a base, having a periphery, a first surface with multiple marking members, a second surface and a contact pad receiving area. To connect the marking device to the stationary object, a pair of mirror image C-shaped walls is mounted at right angles to the base on opposing sides of the contact pad receiving area. The spaces between the ends of the C-shaped walls form a pair of opposing receiving areas. The marking device can further comprise outer walls around the periphery of the base and spaced from the C-shaped walls to form channels. The outer walls, mounted at substantially right angles to the base, are non-contiguous proximate the ends of said C-shaped walls.

In some embodiments a contact pad can be incorporated to prevent immediate contact with the marking members. The contact pad is dimensioned slightly less than the contact pad receiving area and is connected to the base through the use of opposing connectors. The entire device, including the base, opposing C-shaped walls, connectors and contact pad can all be molded from a single mold.

In another embodiment, the contact pad can have a pair of opposing flanges which interact with flange receiving areas in the base. The flange receiving areas, positioned adjacent to the contact pad receiving area, are dimensioned to receive the opposing contact pad flanges permitting the contact pad to be removable.

The marking device is ideal for marking the location of outlet/switch boxes and the like on any sheet material. The use of the C-shaped walls and the removal of the contact pad permits the device to be used after the installation of receptacles or light switches.

BRIEF DESCRIPTION OF THE DRAWINGS

The advantages of the instant disclosure will become more apparent when read with the specification and the drawings, wherein.

DETAILED DESCRIPTION

The disclosed marking device enables a user to rapidly and accurately mark sheets of material with the outline and location of an object positioned behind the material. Although cutting plasterboard and paneling at the location of outlet boxes is an obvious use of the marking device, other uses, such as marking for ceiling light fixtures, air ducts, water pipes, etc. will become evident to those skilled in the art. The marking indicators can, if applicable, be placed on the front of a panel, or other material, to indicate the presence of an underlying object, such as a gas line. The following descriptions relate to the installation of a rigid material, such as plasterboard or paneling. Other materials, however, can be marked in the same manner as described herein and additional uses for the device will be evident.

The standard practice for marking and cutting outlets and other items located within walls or floors was through measuring. For instance, to cut a sheet of plasterboard for an outlet, the user would measure from the floor to the outlet box and then from the nearest installed sheet or wall to the object. These measurements would then be transferred to the piece of plasterboard. In the transfer, the user must also remember to allow for any off sets required between the floor and the plasterboard. The disclosed device enables the user to place the device onto an outlet/switch box having a switch or plug already installed, press the plasterboard against the device on the box and then cut around the outline.

In parent patent U.S. Pat. No. 6,226,822 Issued May 8, 2001, which is incorporated herein as though recited in full, an outlet marking device, and various embodiments, was disclosed. In a subsequent patent, U.S. Pat. No. 6,470,585 issued Oct. 29, 2002 integral contact flanges replaced the full contact pad. In co-pending U.S. application Ser. No. 10/282,662 filed Oct. 29, 2002 a single integral pad was incorporated, in combination with marking pins, thereby dramatically reducing the cost. It has now been found that by partial removal of the horizontal receiving channels the device can be used with plug receptacles or light switches already installed in the outlet box. The partial removal of the channels allows room for the ends, or "ears" of the plug receptacles or light switches to be accommodated, thereby enabling the device to be used with both plug receptacles and light switches already installed.

Figure 1:
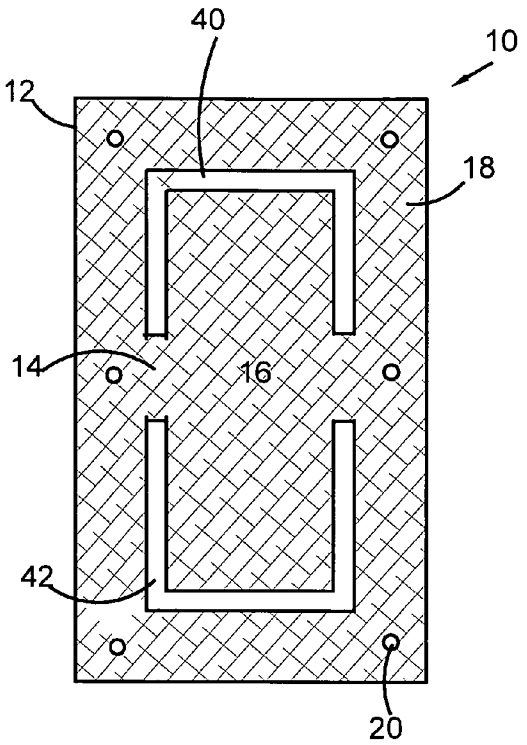
FIG. 1 is a front view of the disclosed marking device.
Figure 2:
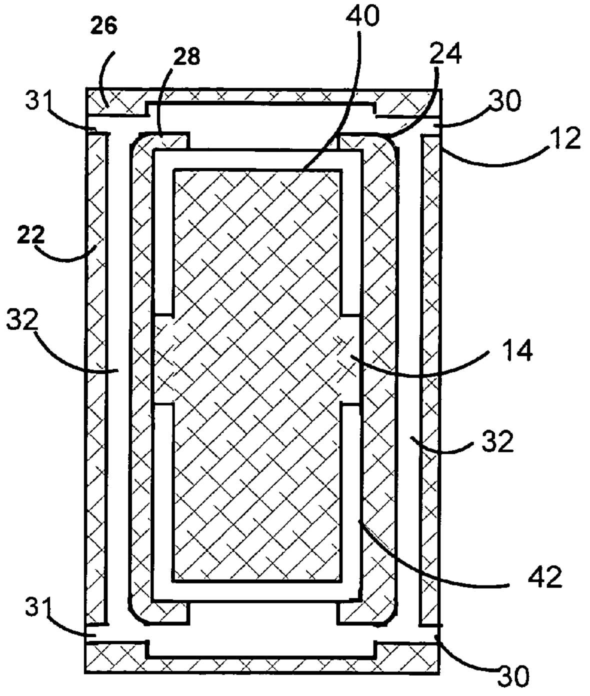
FIG. 2 is a back view of the marking device of FIG. 1.

The embodiment of the marking device 10 illustrated in FIGS. 1 and 2, is configured for use with outlet and switch boxes with the plug receptacle or switch mounted. The face 18 of the marking device 10 is illustrated in FIG. 1 wherein the body 12 is provided with an upper cutout 40 and lower cutout 42 that together form the contact pad receiving area. The contact pad 16 is affixed to the body 12 through use of connectors 14. In this embodiment, pins 20 are used as the marking devices which are placed around the periphery of the face 18. The placement of the pins 20, or other marking member, must form an outline that is slightly greater than the periphery of the outlet box in order to provide sufficient clearance after cutting. Although pins 20 are used in the illustrated embodiment to mark the cutting lines, the marking members can be any method of transferring a mark to the back of the sheet material. Other methods of marking, such as chalk, lead and ink, are disclosed in the above identified applications and patents.

Figure 3:
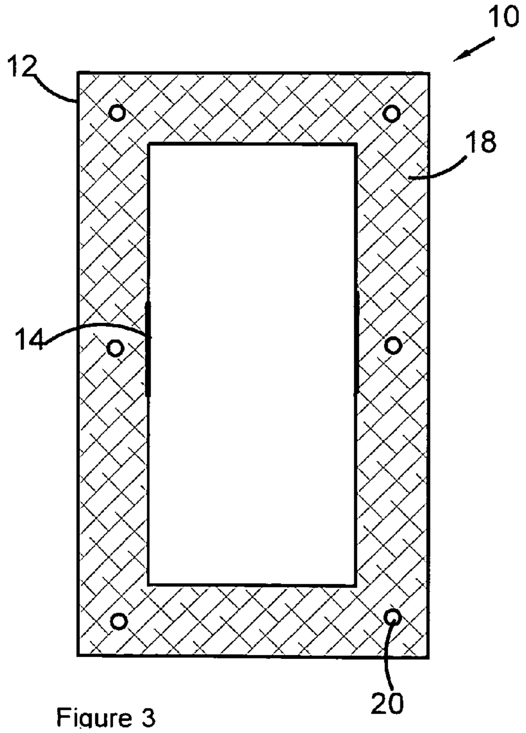
FIG. 3 is a front view of the marking device with the contact pad removed.

In order to utilize the embodiment of FIG. 1 with previously installed switch elements, or the plug receptacles, the contact pad 16 is cut at the connectors 14 and removed, as illustrated in FIG. 3. This removes the conflict between the light switch or plug receptacle and the contact pad. In embodiments that are being used for light switches, the pins are lengthened to enable to pins to extend a sufficient distance beyond the light switch to contact the sheet material.

The back of the marking device 10, as illustrated specifically in FIG. 2, incorporates an opposing pair of horizontal channels 30 and 31 and an opposing pair of vertical receptacle channels 32. The horizontal channels 30 and 31 extend from the periphery of the body 12 toward the center and are formed by end walls 26 and the ends of C-shaped interior walls 28. The horizontal channels 30 and 31 are also open to the periphery of the body 12 to form an open area from one side of the body 12 to the other. The open ends of the channels 30 and 31 enable the marking device to be placed upon a double gang or larger outlet box having a width wider than the body 12. When used with a receptacle box the same size as the device, the horizontal channels 30 and 31, which are connected to the vertical receiving channels 32, receive the corners of the receptacle box. In this embodiment, the corners 24 of the C-shaped interior walls 28 have been rounded to accommodate the newer outlet/switch boxes. In order to prevent the weakening of the C-shaped interior walls 28, the corners 24 of are only curved a slight amount by removing about ⅛ inch of the square portion of the corner. It should also be noted that the corners 24 can be cut at an angle rather than being curved as the function remains the same.

The C-shaped interior wall 28 extends inwardly beyond the vertical receiving channels 32 the maximum amount possible while still allowing room for the ends, or "ears" of the receptacle or light switch to be accommodated. It has been found that approximately ⅝ of an inch provides sufficient clear space for the accommodation points while still maintaining the ability to securely connect with the outlet box, although this dimension can vary.

The channels 32 are formed by opposing exterior vertical walls 22 and C-shaped interior walls 28 which are preferably molded as an integral part of the body 12 at the time of manufacture, as are walls 26. The width of the horizontal channels 30 and 31 and of the vertical receiving channels 32 is such that they form a friction fit with the edges of the outlet box. Although the friction fit should not be so snug as to be difficult to remove, the fit must be such that the device 10 will stay on the outlet box during the marking process.

When the marking device 10 is used on a double gang or larger outlet/switch box, one of the vertical receiving channels 32, along with the horizontal channels 30 and 31 are positioned to be engaged with the actual outlet/switch box, thus enabling same marking device to be used for single, double and larger outlet/switch boxes. The open horizontal channels 30 and 31 permit the edges of the outlet/switch box to extend beyond the width of the marking device 10. It should be noted that the marking device 10 can also be placed in the center of a larger outlet/switch box, maintained in position by the horizontal channels 30 and 31, with neither vertical channel 32 being engaged with the outlet/switch box. Alternatively, the disclosed marking device can be enlarged to extend around the periphery of the double, or even triple, outlet switch boxes.

In the preferred embodiment, the marking devices disclosed herein are manufactured from a material, such as ABS plastic nylon, vinyl or hard rubber, which maintains a memory and has a high resistance to breakage after repeated flexing. Preferably the material enables the entire unit to be manufactured as a single piece; however in embodiments where the material of manufacture is unable to be molded as a single unit, the method of connecting the flexing contact pad to the body through use of connectors will be evident to those skilled in the art.

Figure 4:
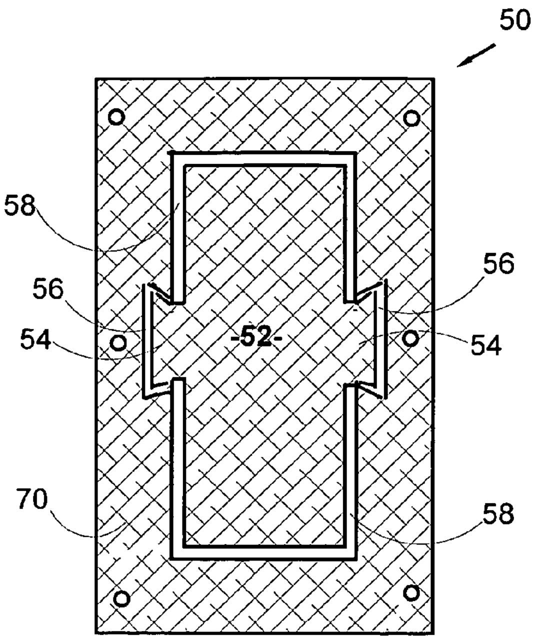
FIG. 4 is an alternate embodiment of the marking device having a removable contact pad.

When using the device without an installed switch element, the sheet material contacts first the contact pad 16, which extends beyond the surface of the face 18 and marking pins 20. The sheet material is then pressed toward the wall, depressing the contact pad 16, and is marked by the marking pins 20, or other marking means. However, when a light switch has already been installed in the outlet/switch box, as stated heretofore, the contact pad 16 will prevent the marking device 10 from being properly mounted. To use the device on outlet/switch boxes with previously mounted light switches, the contact pad 16 can be removed, as illustrated in FIG. 3, or the marking device 50, illustrated in FIGS. 4-6 can be used. To remove the contact pad 16, the connectors 14 are cut, thereby releasing the contact pad 16 from the marking device 10.

Figure 5:
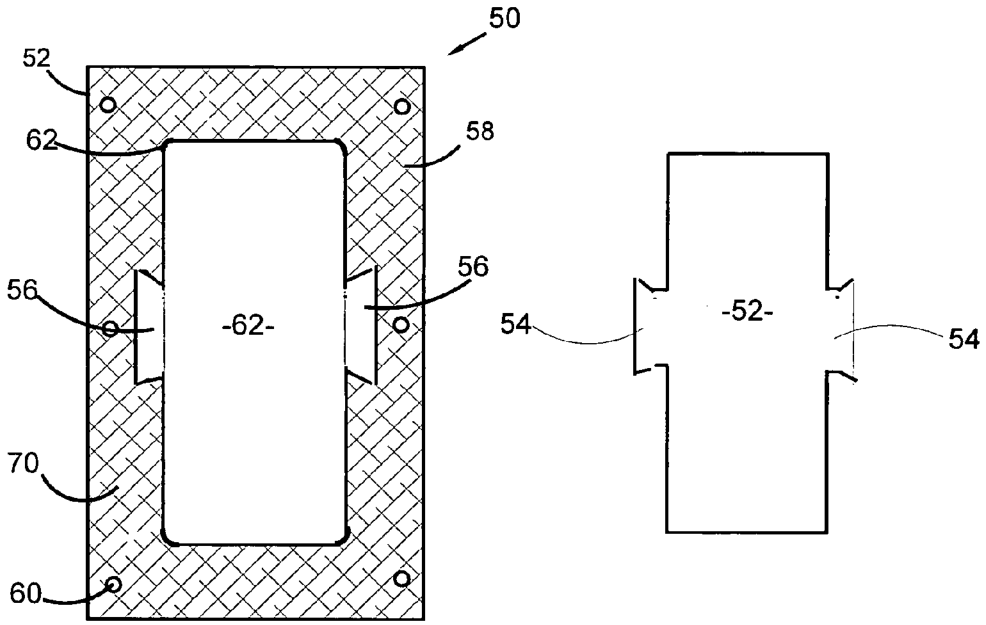
FIG. 5 is an exploded front view of the embodiment of FIG. 4 showing the contact receiving pad removed from the marking device.
Figure 6:
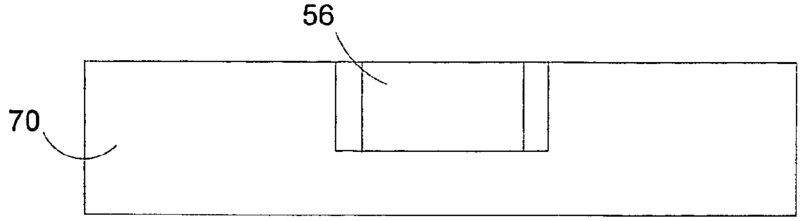
FIG. 6 is a side view of the embodiment of FIG. 4 showing the flange receiving area.

The marking device 50, illustrated in FIGS. 5 and 6, has a removable contact pad 52 that has opposing flanges 54 that are received in the flange receiving recesses 56 of the body 58. The contact pad 52 is dimensioned, as with prior embodiments, to “float” within the contact pad receiving area 62 except where connected to the body 58, to enable the contact pad 52 to have the flexibility required to move under pressure applied to the sheet material. In this embodiment, rather than having the contact pad 52 molded onto the body 58, as illustrated in FIG. 1, the connectors 14 have been replaced with flange receiving recesses 56 and flanges 54. The flange receiving recesses 56 extend into the body 58, as illustrated in FIG. 6, the depth of the flanges 54, thereby placing the contact pad 52 in the appropriate position as discussed heretofore. When marking an outlet/switch box that has an installed plug receptacle or light switch, the contact pad 52 is removed, leaving the contact pad receiving area 62 open as illustrated in FIG. 5.

The interaction between the flange receiving recesses 56 and the flanges 54 must be such that the contact pad 52 can be easily removed and reinserted but still maintains sufficient friction to hold the contact pad 52 in place during use.

The depth of the flange receiving recesses 56 must be such that when the contact pad 52 is inserted, the distance between the uncompressed contact pad 52 and the marking point of the pins 60 is not so great as to require undue pressure. As with prior embodiments a distance of about ⅛ to about ¼ inch will be sufficient for most end uses, however in some cases the dimensions can require adjusting.

Figure 7:
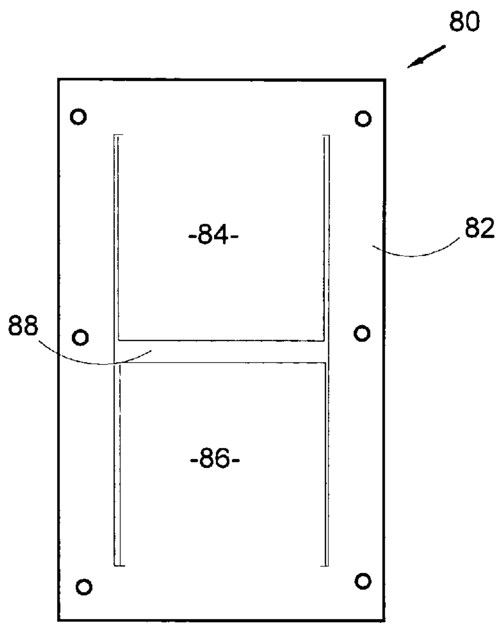
FIG. 7 is a front view of an alternate embodiment of the disclosed marking device.
Figure 8:
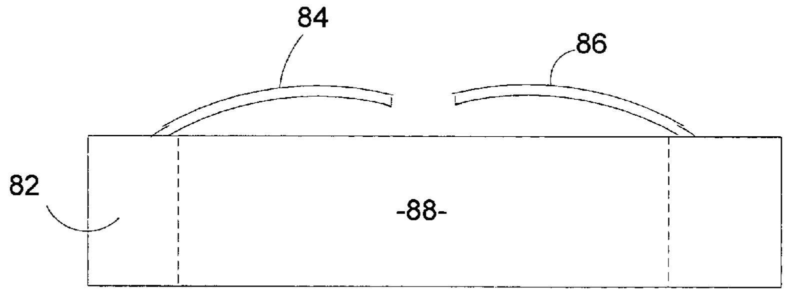
FIG. 8 is a side view of the embodiment of FIG. 7.

An alternate embodiment is illustrated in FIGS. 7 and 8 wherein the pair of contact pads 84 and 86 extend from either end of the contact receiving area 88. The contact pads 84 and 86 arc upward, away from the body 82 a sufficient distance to provide space for the light switch. In this embodiment, the contact pad 84 is proximate, but not touching the opposing contact pad 86. Although the contact pads 84 and 86 should be as long as possible to provide optimum flex and durability, the distance between the two opposing contact pads 84 and 86 should be such that the contact pads 84 and 86 to not contact one another when compressed. Preferably the contact pads 84 and 86 are molded as part of the body 82, thereby providing additional strength and integrity. However, with some materials, it may be beneficial to have the contact pads added to the body.

Figure 9:
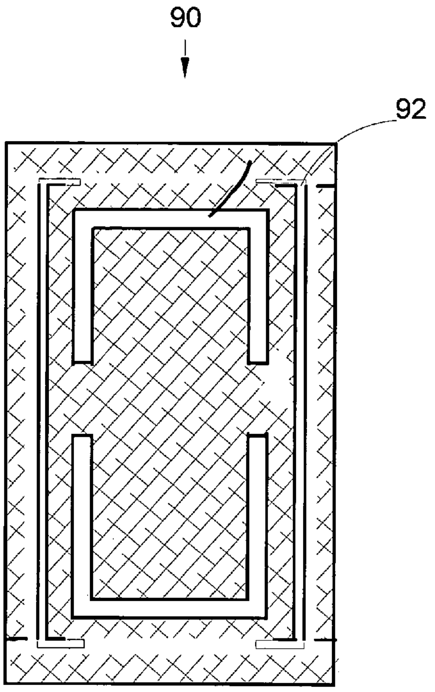
FIG. 9 is a front view of an alternate embodiment having only C-shaped inner walls.

In the embodiment of FIG. 9, the outer walls have been removed and the marking device 90 is maintained on the outlet/switch box, or other stationary object, by the C-shaped inner walls 92. In this embodiment, the dimensioning of the C-shaped inner walls 92 must be slightly less than the periphery of the stationary object. Alternatively, the C-shaped walls can be removed with only the outer walls maintaining the marking device on the outlet/switch box.

It should be obvious to anyone skilled in the art that the dimension and design of any of the foregoing embodiments can be altered for use with other specifically sized outlets, such as double gang outlet/switch boxes, ceiling car stereo cutouts, A/C inlet/outlets, etc. Additionally, any of the extenders or spacers disclosed in the foregoing parent applications can be incorporated with the disclosed device to enable the device to be used on receptacle boxes containing plug receptacles or light switches.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A marking device for placing an indicator mark on one side of a sheet of material to mark the approximate periphery of at least a portion of a stationary object, said marking device having:

a base, said base having a periphery, a first surface with multiple marking members, a second surface and a contact pad receiving area;

a pair of mirror image C-shaped walls on opposing sides of said contact pad receiving area, said C-shaped walls having a first end and a second end and being at substantially right angles to said second surface of said base, a pair of opposing receiving areas, said receiving areas being a space between said C-shaped walls.

2. The marking device of claim 1 further comprising outer walls around said periphery of said base at substantially right angles to said second surface of said base, said outer walls being spaced from said C-shaped walls to form channels.

3. The marking device of claim 2 wherein said outer walls are non-contiguous proximate said first end and said second end of said C-shaped walls.

4. The device of claim 1 further comprising at least one flexible contact pad, said at least one contact pad being dimensioned slightly less than said contact pad receiving area.

5. The device of claim 3 further comprising at least one flexible contact pad, said at least one contact pad being dimensioned slightly less than said contact pad receiving area.

6. The device of claim 5 wherein said at least one flexible contact pad is a single contact pad affixed to said base with connectors, said connectors being integral to said base and said contact pad.

7. The marking device of claim 6 wherein said base, said outer walls, said opposing C-shaped walls, said pair of connectors and said contact pad are molded from a single mold.

8. The marking device of claim 4 wherein said base, said opposing C-shaped walls, said pair of connectors and said contact pad are molded from a single mold.

9. The device of claim 4 wherein said at least one contact pad is a single contact pad further comprises opposing flanges.

10. The device of claim 9 further comprising a pair of opposing flange receiving areas, said pair of opposing flange receiving areas being adjacent to said contact pad receiving area and dimensioned to removably receive said opposing flanges of said contact pad.

11. The device of claim 1 wherein said stationary object is an electrical outlet box.

12. The device of claim 11 wherein said opposing receiving areas are dimensioned to receive an electrical receptacle mounted in said electrical outlet box.

13. The device of claim 4 wherein said at least one contact pad is a pair of arced opposing contact pads, each of said pair of opposing contact pads being affixed to opposing ends of said contact pad receiving area.

14. The marking device of claim 13 wherein said base, said opposing C-shaped walls, said outer walls, said pair of connectors and said contact pad are molded from a single mold.

15. A marking device for placing an indicator mark on one side of a sheet of material to mark the approximate periphery of at least a portion of a stationary object, said marking device having:

a base, said base having a periphery, a first surface with multiple marking members, a second surface and a contact pad receiving area;

a pair of mirror image C-shaped walls on opposing sides of said contact pad receiving area, said C-shaped walls having a first end and a second end and being at substantially right angles to said second surface of said base, a pair of opposing receiving areas, said receiving areas being the space between said C-shaped walls, outer walls around said periphery of said base at substantially right angles to said second surface of said base, said outer walls being non-contiguous proximate said first end and said second end of said C-shaped walls and spaced from said C-shaped walls to form connected channels.

16. The device of claim 15 further comprising a contact pad, said contact pad being dimensioned slightly less than said contact pad receiving area.

17. The device of claim 16 wherein said contact pad is affixed to said base with connectors, said connectors being integral to said base and said contact pad.

18. The device of claim 16 wherein said contact pad further comprises opposing flanges.

19. The device of claim 18 further comprising a pair of opposing flange receiving areas, said pair of opposing flange receiving areas being adjacent to said contact pad receiving area and dimensioned to removably receive said opposing flanges of said contact pad.

20. A connection system for securing a device to the periphery of at least a portion of a stationary object, said connection system having:

a pair of mirror image C-shaped walls on opposing sides of said contact pad receiving area, said C-shaped walls having a first end and a second end and being at substantially right angles to said second surface of said base, a pair of opposing receiving areas, said receiving areas being the space between said C-shaped walls.

21. The connection system of claim 20 further comprising outer walls around said periphery of said base at substantially right angles to said second surface of said base, said outer walls being spaced from said C-shaped walls to form channels.

22. The connection system of claim 21 wherein said outer walls are non-contiguous proximate said first end and said second end of said C-shaped walls.

23. The method of marking a sheet of material with an outline of a position of a stationary object having an open interior formed by edges, said stationary object using a masking device having a base, multiple marking members around the periphery of a first surface of said base, and a securing system on a second surface of said base, comprising the steps of:

positioning a pair of mirror image C-shaped walls located on opposing sides of said contact pad receiving area and being at substantially right angles to said second surface of said base, over said stationary object, pressing said marking device to said C-shaped walls within said open interior, adjacent to said edges, of said stationary object, placing said sheet of material against said marking device, applying pressure to said material, causing said marking members to come in contact with said sheet of material;

removing said sheet of material.

24. The method of claim 23 further comprising the step of forming channels between, said C-shaped walls and non-contiguous outer walls spaced from said C-shaped wails around a periphery of said base, said channels being dimensioned to receive said edges of said stationary object.

25. The method of claim 23 further comprising the step of positioning said sheet material distanced from said multiple marking members with a flexible contact pad and positioning said sheet material in contact with said multiple marking members by pressing on said contact pad.

26. The method of claim 25 further comprising the step of enabling said marking device to be used with a stationary object having a second object protruding from said interior beyond the plane of said edges by removing said contact pad.

27. The method of claim 26 further comprising the step of removably connecting said contact pad to said base by flanges on said contact pad that interact with flange receiving areas within said base.

* * * * *